US012548752B2

(12) United States Patent
Dziekonski

(10) Patent No.: US 12,548,752 B2
(45) Date of Patent: Feb. 10, 2026

(54) SYSTEMS AND METHODS FOR ION INJECTION INTO AN ELECTROSTATIC TRAP

(71) Applicant: DH TECHNOLOGIES DEVELOPMENT PTE. LTD., Singapore (SG)

(72) Inventor: Eric Thomas Dziekonski, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 368 days.

(21) Appl. No.: 18/248,448

(22) PCT Filed: Sep. 14, 2021

(86) PCT No.: PCT/IB2021/058383
§ 371 (c)(1),
(2) Date: Apr. 10, 2023

(87) PCT Pub. No.: WO2022/079510
PCT Pub. Date: Apr. 21, 2022

(65) Prior Publication Data

US 2023/0411139 A1 Dec. 21, 2023

Related U.S. Application Data

(60) Provisional application No. 63/090,844, filed on Oct. 13, 2020.

(51) Int. Cl.
*H01J 49/42* (2006.01)

(52) U.S. Cl.
CPC ........ *H01J 49/4225* (2013.01); *H01J 49/427* (2013.01)

(58) Field of Classification Search
CPC ... H01J 49/4215; H01J 49/4225; H01J 49/427
See application file for complete search history.

(56) References Cited

U.S. PATENT DOCUMENTS 6,753,523 B1 * 6/2004 Whitehouse ........ H01J 49/4225 250/292
2012/0168619 A1 * 7/2012 Guna .................... H01J 49/427 250/281
2016/0084799 A1 * 3/2016 Makarov ............. H01J 49/0031 250/281

FOREIGN PATENT DOCUMENTS

CA 2463433 C * 6/2012 ............ H01J 49/066
EP 1706890 A2 10/2006
EP 1706890 B1 * 3/2014 .......... H01J 49/0095

OTHER PUBLICATIONS

Guo et al, "Space Charge Induced Nonlinear Effects in Quadrupole Ion Traps", Journal of the American Society for Mass Spectrometry, vol. 25 p. 498-508, 2014 (Year: 2014).*

(Continued)

*Primary Examiner* — David E Smith
(74) *Attorney, Agent, or Firm* — Lathrop GPM LLP; Malaika O.D. Tyson; Jason Kuchar

(57) ABSTRACT

Systems and methods are disclosed for ion injection into an electrostatic trap. As non-limiting examples, various aspects of this disclosure provide a quadrupole comprising first, second, and third quadrupole segments. The second quadrupole segment may be arranged between the first and third quadrupole segments and the first quadrupole segment and the third quadrupole segment may each comprise four poles with auxiliary electrodes arranged between each pair of the four poles. The second quadrupole segment may comprise four poles and the first and third quadrupoles each may comprise four individual auxiliary electrodes, two pairs of auxiliary electrodes, two electrodes, or one pair of auxiliary (Continued)

electrodes. The auxiliary electrodes of the first quadrupole segment and the entrance lens may be biased at a same direct current (DC) voltage. The auxiliary electrodes of the third quadrupole segment and the exit lens may be biased at a same DC voltage.

22 Claims, 9 Drawing Sheets

(56) References Cited

OTHER PUBLICATIONS

PCT International Search Report and Written Opinion for PCT Patent Application No. PCT/IB2021/058383 mailed Jan. 4, 2022.

* cited by examiner

SYSTEMS AND METHODS FOR ION INJECTION INTO AN ELECTROSTATIC TRAP

CROSS-REFERENCE TO RELATED APPLICATIONS/INCORPORATION BY REFERENCE

The present application is filed pursuant to 35 U.S.C. 371 as a U.S. National Phase application of International Patent Application No. PCT/IB2021/058383, which was filed Sep. 14, 2021. claiming the priority benefit of U.S. Provisional Patent Application Ser. No. 63/090,844, filed Oct. 13, 2020. The entire text of the aforementioned applications is hereby incorporated by reference in its entirety into this disclosure.

BACKGROUND

Conventional approaches for ion injection into an electrostatic trap may be costly, cumbersome, and/or inefficient—e.g., they may be complex and/or difficult to implement, and may exhibit poor capture efficiency, low ion capacity, highly non-linear or asymmetrical extraction fields, slow rise times of extraction voltages, multiple tank circuits, and ions trapped within fringing fields.

SUMMARY

Figure 1:
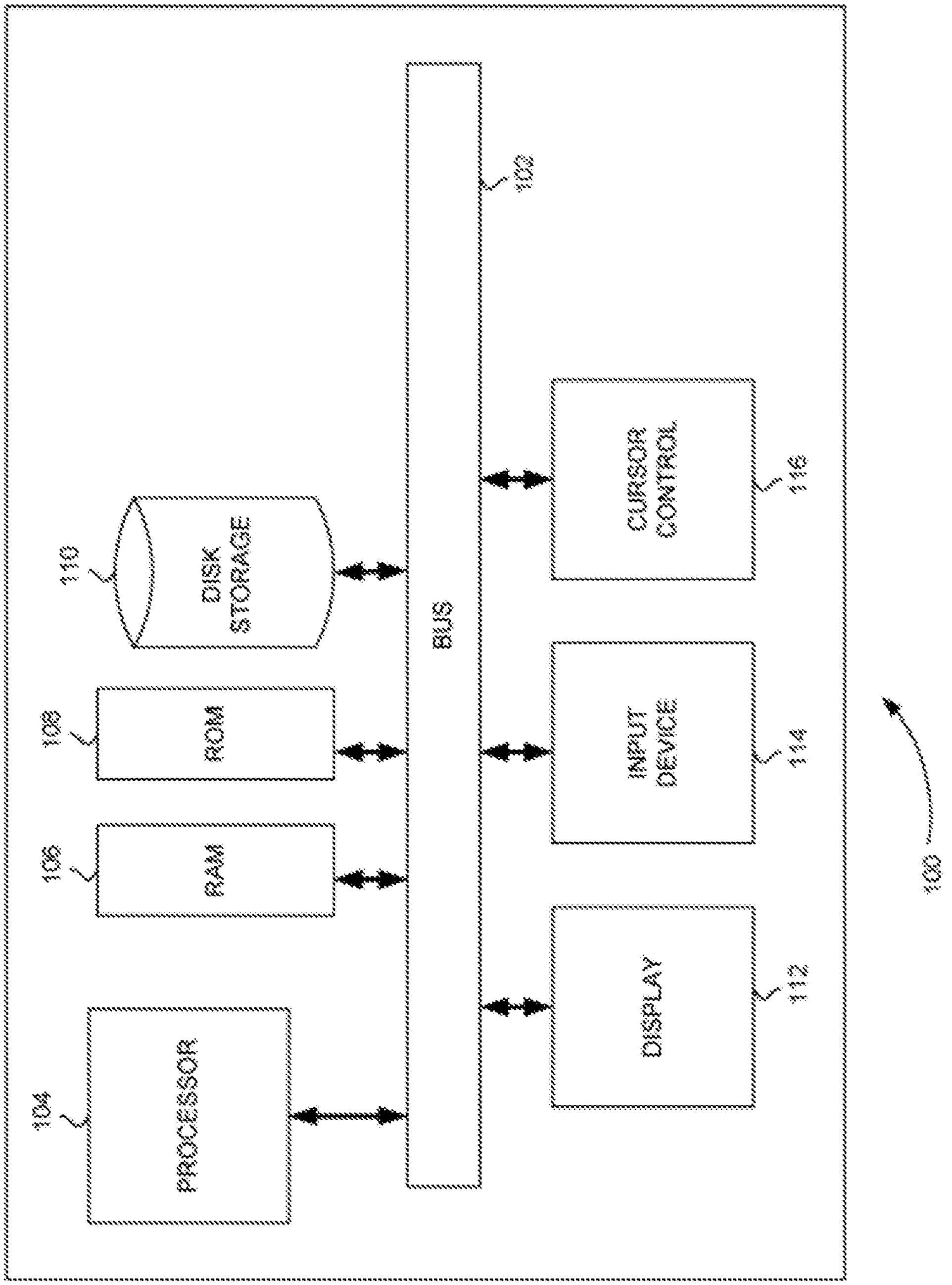
FIG. 1 is a block diagram that illustrates a computer system, upon which embodiments of the present teachings may be implemented.

Various aspects of this disclosure provide systems and methods for ion injection into an electrostatic trap. As non-limiting examples, various aspects of this disclosure provide a quadrupole comprising first, second, and third quadrupole segments. The second quadrupole segment may be arranged between the first and third quadrupole segments and the first quadrupole segment and the third quadrupole segment may each comprise four poles with auxiliary electrodes arranged between each pair of the four poles.

Various aspects of this disclosure provide systems and methods for ion injection into an electrostatic trap. As non-limiting examples, various aspects of this disclosure provide the second quadrupole segment may comprise four poles and the first and third quadrupoles each may comprise four individual auxiliary electrodes or two pairs of auxiliary electrodes. The auxiliary electrodes of the first quadrupole segment and the entrance lens may be biased at a same direct current (DC) voltage.

Various aspects of this disclosure provide systems and methods for ion injection into an electrostatic trap. As non-limiting examples, various aspects of this disclosure provide the auxiliary electrodes of the third quadrupole segment and the exit lens may be biased at a same DC voltage. Charged ions may be confined to the second quadrupole section by applying radio frequency (RF) and DC voltages to the poles of the first, second, and third quadrupole sections and a first DC voltage to the auxiliary electrodes and the entrance and exit lenses. While the ions are trapped, the entrance, exit, and auxiliary electrodes may be at the same voltage, but when pulsed for ejection, the entrance and auxiliary 1 electrodes may go to a more repulsive DC potential, while the exit and auxiliary 3 electrodes may go to a more attractive DC potential.

Various aspects of this disclosure provide systems and methods for ion injection into an electrostatic trap. As non-limiting examples, various aspects of this disclosure provide charged ions may be ejected from the quadrupole by pulsing the entrance and exit lenses and auxiliary electrodes using a second DC voltage at the auxiliary electrodes and the entrance and exit lenses.

Various aspects of this disclosure provide systems and methods for ion injection into an electrostatic trap. As non-limiting examples, various aspects of this disclosure provide the second DC voltage may comprise a push-pull potential at the entrance and exit lenses or an attractive potential at the exit lens. The ejected ions may comprise Gaussian ion packets upon application of the second DC voltage to the entrance and exit lens and auxiliary electrodes.

Various aspects of this disclosure provide systems and methods for ion injection into an electrostatic trap. As non-limiting examples, various aspects of this disclosure provide fringing fields generated by the entrance and exit lenses may be confined to the first and third quadrupole sections. Each pair of poles in the first quadrupole section may be capacitively coupled to corresponding pairs of poles in the second and third quadrupole sections. The auxiliary electrodes may be equidistant from a center axis of the quadrupole along a length of the quadrupole or have increasing distance from the center axis away from a center of the quadrupole.

DETAILED DESCRIPTION OF VARIOUS ASPECTS OF THE DISCLOSURE

As utilized herein the terms “circuits” and “circuitry” refer to physical electronic components (i.e., hardware) and any software and/or firmware (“code”) that may configure the hardware, be executed by the hardware, and or otherwise be associated with the hardware. As used herein, for example, a particular processor and memory (e.g., a volatile or non-volatile memory device, a general computer-readable medium, etc.) may comprise a first “circuit” when executing a first one or more lines of code and may comprise a second “circuit” when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

The current state of product development, and scientific advancement in general, for example in the life sciences, is hampered by current systems and methods, adding literally years to product and/or scientific development cycles.

FIG. 1 is a block diagram that illustrates a computer system, upon which embodiments of the present teachings may be implemented. Computer system 100 may comprise a bus 102 or other communication mechanism for communicating information, and a processor 104 coupled with bus 102 for processing information. Computer system 100 may also comprise a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 may comprise a read only memory (ROM) 108 or other static storage device coupled to bus 102 for storing static information and instructions for processor 104. A storage device 110, such as a magnetic disk or optical disk, may be provided and coupled to bus 102 for storing information and instructions.

Computer system 100 may be coupled via bus 102 to a display 112, such as a light emitting diode (LED) or liquid crystal display (LCD), for displaying information to a computer user. An input device 114, including alphanumeric and other keys, may be coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 may be connected to one or more other computer systems, like computer system 100, across a network to form a networked system. The network may comprise a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a communications link. A modem local to computer system 100 can receive the data on the link and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method may be stored on a computer-readable medium. The computer-readable medium may comprise a device that stores digital information. For example, a computer-readable medium includes a compact disc read-only memory (CD-ROM), universal serial bus (USB) drive, or other storage device as is known in the art for storing software. The computer-readable medium may be accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

In an example scenario, the computer system 100 may be operable to control a mass spectrometer system, such as the system described with respect to FIGS. 2-8. Accordingly, the computer system 100 may be operable to control circuitry for applying RF and DC voltages to segmented quadrupoles for injecting ions into subsequent blocks for processing. The computer system 100 may also be operable for reading measurements based on the injected ions, such as detector outputs, for example.

Figure 2:
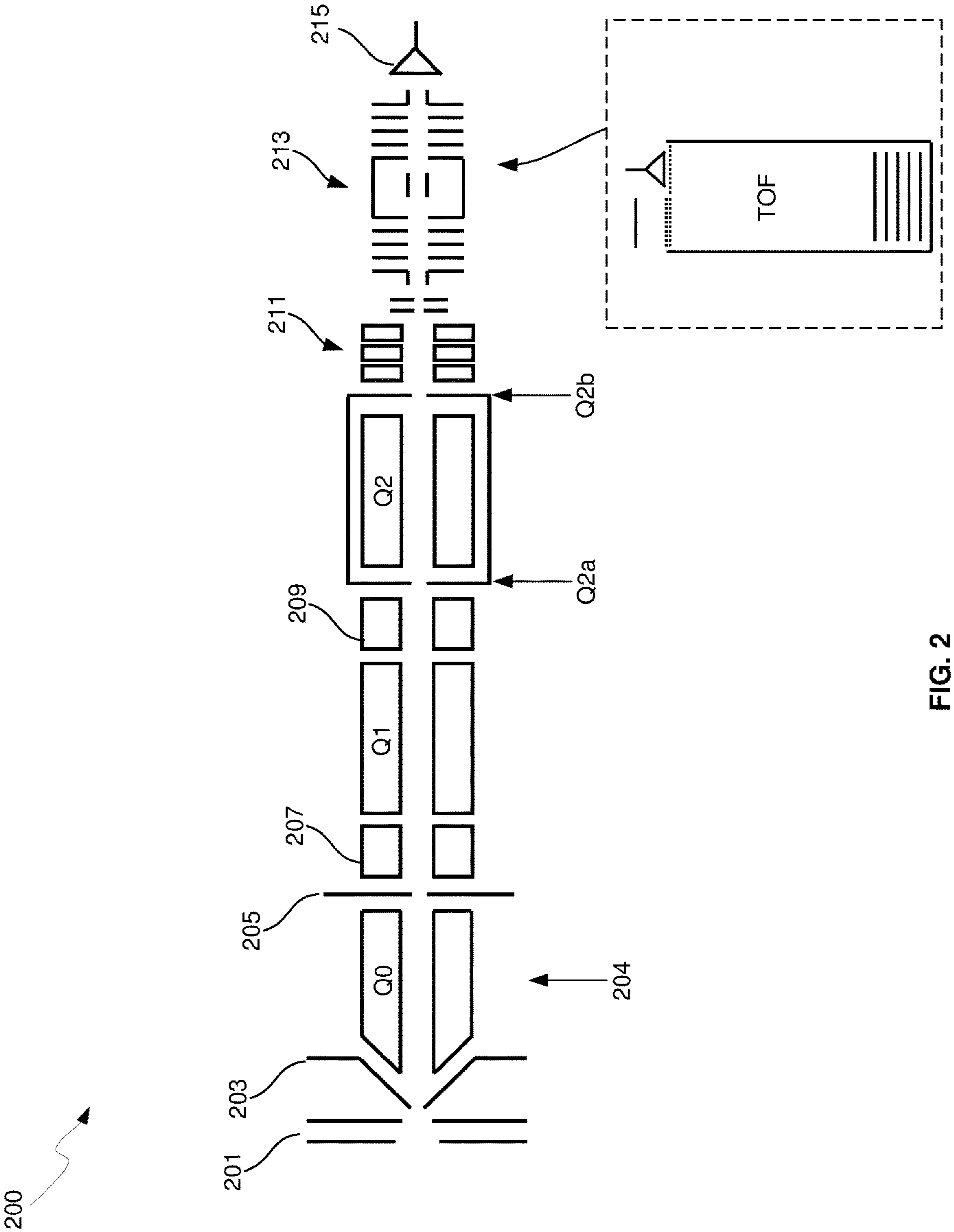
FIG. 2 is a schematic diagram of a mass spectrometer system, in accordance with an example embodiment of the disclosure.

FIG. 2 is a schematic diagram of a mass spectrometer system, in accordance with an example embodiment of the disclosure. Referring to FIG. 2, there is shown mass spectrometer 200 comprising quadrupoles Q0, Q1, and Q2, orifice plates 201 and 205, skimmer 203, additional stubby rods 207 and 209, focusing lens 211, electrostatic linear ion trap (ELIT) 213, and micro-channel plate (MCP) detector 215.

The quadrupoles Q0-Q2 comprise four electrodes/poles that may be biased with DC and/or AC voltages for capturing, confining, and ejecting charged ions. The electrodes may be cylindrical or may have a hyperbolic shape, for example. Furthermore, one or more of the quadrupoles Q0-Q2 may comprise segmented elongated rods and auxiliary electrodes arranged between the segmented rods in the outer segments of the quadrupole for improved confinement. For example, Q1 may comprise a segmented quadrupole, with three segments, where a first and third segment comprise auxiliary electrodes, while a second segment arranged between the first and third segments does not have the auxiliary electrodes. The independent electrodes enable confinement in the second segment away from any fringing fields. This is shown further with respect to FIGS. 3-8.

The orifice plates 201 and 205 may comprise plates with an orifice formed therein for allowing ions to pass through but with the orifice being small enough to enable a pressure difference between chambers, such as between vacuum chamber 204 and other higher pressure regions of the mass spectrometer 200.

The stubby rods 207 and 209 may comprise shorter rods, as compared to Q0-Q2, that guide ions between Q0 and Q2, and may also be biased with DC and/or RF fields for transporting ions confined along a central axis. The ELIT 213 may comprise electrode plates at the entrance and exit sides of the ELIT 213, with a pickup electrode centered within the electrode plates. The electrode plates have holes for allowing ions to pass, where the plates are biased such that the ions oscillate radially and axially with radial oscillation being the minor of the two, and are also reflected back in the axial direction, thereby causing the ions to oscillate within the ELIT. These plates are also known as reflectron plates. As ions pass through the pickup electrode, a current is induced, which may be sensed and amplified. In addition, the detector 215 may comprise an electron multiplier, for example, that is used to detect the number of charged ions ejected from the ELIT 213.

During operation of the mass spectrometer 200, ions may be admitted into vacuum chamber 204 through orifice plates 201 and skimmer 203. Ions may be collisionally cooled in Q0, which may be maintained at a low pressure, such as less than 100 mTorr, for example. Quadrupole Q1 may operate as transmission RF/DC quadrupole mass filter, and may be segmented for injecting highly confined ion packets into Q2. Q2 may comprise a collision cell in which ions collide with a collision gas, such as nitrogen, for example, to be fragmented into products of lesser mass. Ions may be trapped radially in any of Q0, Q1, and Q2 by RF voltages applied to the rods and axially by DC voltages applied to the end aperture lenses or orifice plates. In addition, Q2 may comprise orifice plates Q2*a* and Q2*b* to enable a pressure difference between the higher pressure of Q2 and other regions of mass spectrometer 200.

According to aspects of the present disclosure, an auxiliary RF voltage may be provided to end rod segments, end lenses, and/or orifice plates of one of the rod sets to provide a pseudo potential barrier. By this means, both positive and negative ions may be trapped within a single rod set or cell. Typically, positive and negative ions would be trapped within the high pressure Q2 cell. Once the positive and negative ions within Q2 have reacted, they can be axially ejected through ELIT 213 for analysis, and then optionally to detector 215, depending on the analysis being conducted.

Figure 3:
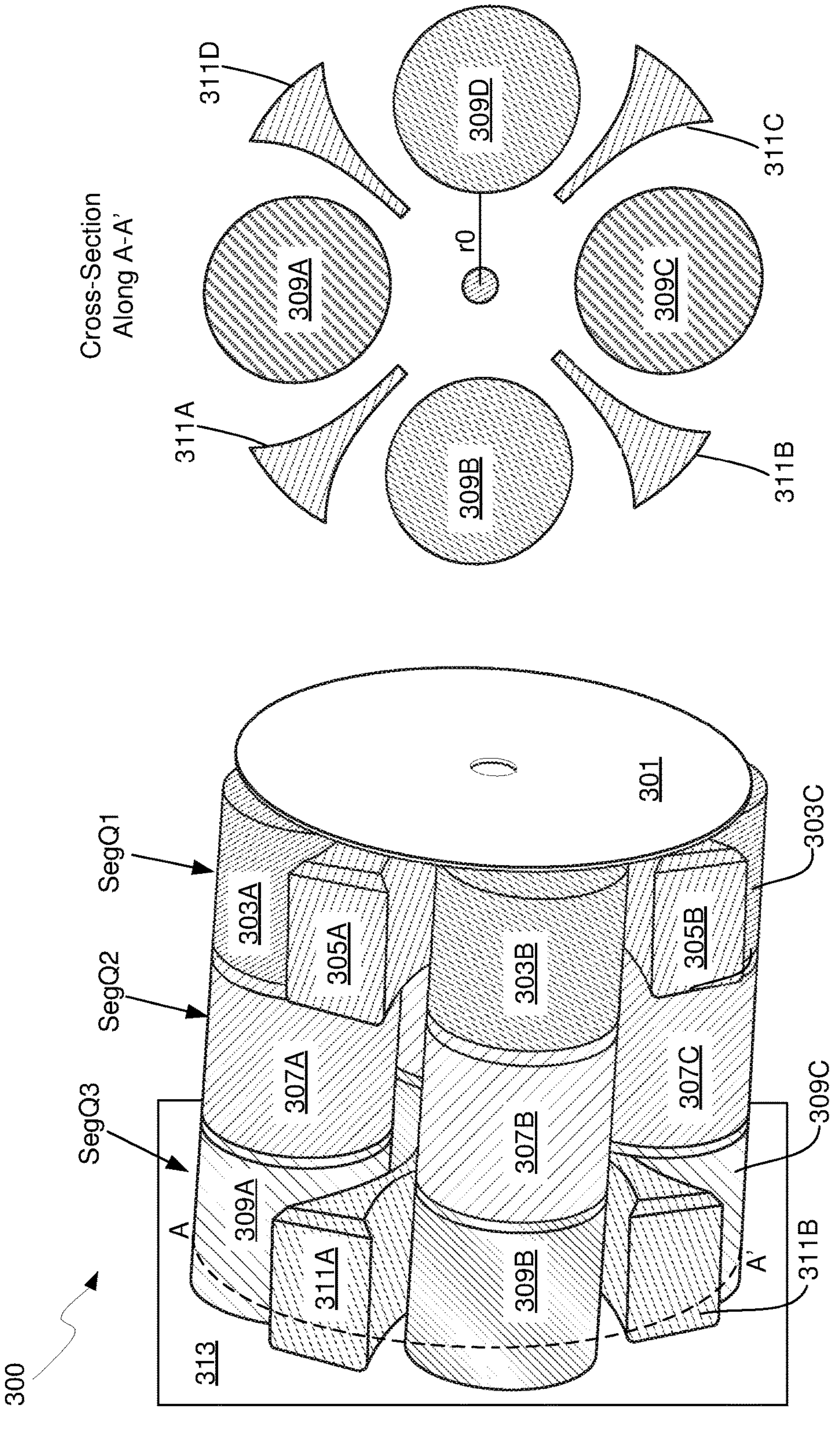
FIG. 3 illustrates a segmented quadrupole with auxiliary electrodes, in accordance with an example embodiment of the disclosure.

FIG. 3 illustrates a segmented quadrupole with auxiliary electrodes, in accordance with an example embodiment of the disclosure. Referring to FIG. 3, there is shown oblique and cross-sectional views of quadrupole 300 showing three segments SegQ1, SegQ2, and SegQ3. There is also shown an entrance lens 301 and an exit lens 313. The entrance lens 301 and exit lens 313 may comprise conductive plates with an orifice at the center allowing ions to pass through, where a bias voltage may be applied on the lenses to provide a push/pull electric field, for example, for charged ions.

In the example shown in FIG. 3, the exit lens 313 is much larger than the rest of the structure, although the disclosure is not so limited. The entrance and exit lenses could be any geometry, such as square, circular, the same size as the entrance lens, etc. . . . , so long as the outer diameter of the lens is sufficiently large to prevent crosstalk between ion optical elements along the central axis of the mass spectrometer. The diameter of the central hole controls how much gas may be allowed into the following region, and thereby the pressure downstream. In one example, a large circular structure may be used for the exit lens 313 as the forces are cylindrically symmetric, and in another example, a small lens may be used if inset into a larger plastic lens, where the combination acts as a conductance limiting aperture to the next vacuum region.

In an example scenario, the segmented triple linear quadrupole 300 with segmented auxiliary electrodes 305A-305D and 311A-311D may be operable to radially and axially confine ions within the center section SegQ2 by applying repulsive potentials to the outer segments SegQ1 and SegQ3 via auxiliary electrodes 305A-305D and 311A-311D and applying RF signals to the poles 303A-303D and 309A-309D. A DC potential may be superimposed on the RF potential. In an example scenario, the center poles 307A-307D may be grounded. The auxiliary electrodes 305A-305D and 311A-311D and the entrance/exit lenses 301/313 may be pulsed in a push-pull manner to axially eject ions from the center section SegQ2 without the need to collapse the RF field on the poles 303A-303D, 307A-307D, and 309A-309D, meaning the RF and push/pull DC voltage are on separate electrode elements. The entrance lens 301 makes the assembly symmetric about the central quadrupole segment SegQ2.

The auxiliary electrodes 305A-305D and 311A-311D comprise conductive terminals for applying fields separate from the poles 303A-303D, 307A-307D, and 309A-309D. As shown in the cross-sectional view of FIG. 3, the auxiliary electrodes 305A-305D and 311A-311D may be configured to be equidistant from the poles 303A-303D and 309A-309D and a similar distance from the central axis of the quadrupole 300 as the distance r0 for poles 303A-303D and 309A-309D. The distance from the auxiliary electrodes 305A-305D and 311A-311D to the central axis of the quadrupole 300 may be constant along the length of their corresponding segment of the quadrupole 300. In an example scenario, opposite DC potentials may be pulsed on the auxiliary electrodes 305A-305D to that applied to auxiliary electrodes 311A-311D, thereby generating a pulsed DC field across the central segment SegQ2 for ejecting ions.

The segmented quadrupole structure shown in FIG. 3 has several inherent benefits over existing technologies. First, when ions are cooled to the center segment SegQ2 of the triple quadrupole 300, the fringing fields generated by the entrance and exit lenses 301/313 are very weak, where the lenses may be >12 mm away, for example, thereby minimizing the axial and radial coupling of the ion motion. In this case, with realistic voltage rise times of <250 ns, the mean injected kinetic energy of the ions is decoupled from the push/pull voltage applied to the auxiliary electrodes 305A-305D and 311A-311D and the entrance/exit lenses 301/313. Additionally, the width of the injected kinetic energy distribution may vary linearly with the push/pull voltages.

Second, the field that the ions are trapped in is symmetric along the ion optical axis along the length of the triple quadrupole 300, due to the short quad segments SegQ1/SegQ3 and the lenses 301/313 on each side of the center segment SegQ2. This generates nearly Gaussian ion packets upon cooling. Along the same lines, the symmetry provides a nearly linear extraction field, thereby retaining the shape of the trapped ion packet upon injection into a subsequent ELIT.

Third, since all of the quads that receive an RF signal have the same capacitively coupled RF signal applied to them, a single tank circuit may be utilized for the collision quad, such as Q2 in FIG. 2, and the segments SegQ1-SegQ3 of triple quadrupole 300. Therefore, the RF signal applied to the poles 303A-303D, 307A-307D, and 309A-309D does not need to be collapsed/deactivated to apply an extraction pulse, as in conventional systems, since it is applied to auxiliary electrodes 305A-305D and 311A-311D and the entrance/exit lenses 301/313, greatly simplifying the electronics.

Furthermore, the accepted m/z range of the downstream ELIT is increased by shortening the three segments, such as to 8 mm, for example, reducing the time-of-flight separation of the ions between where they are trapped and the ELIT. The extent to which ions are bunched, i.e., charge density, can easily be controlled by the magnitude of the trapping DC potentials applied to segments SegQ1 and SegQ3, and/or the entrance and exit lenses, and/or the auxiliary electrodes. Under appropriate conditions, the length of the injected ion packet ejected from the quadrupole 300 may be much smaller than the length of the detection electrode in a downstream ELIT, thereby maximizing the signal.

The highly tunable axial ejection technique described here can control the charge density of the ion packet, thus providing a way to minimize peak coalescence. The RF voltage applied to the poles 303A-303D, 307A-307D, and/or 309A-309D does not need to be turned off and the same RF supply (tank circuit) can be used to drive all three segments, greatly simplifying the RF drive electronics. Additionally, since the tank circuit that drives the RF voltage does not set the rise time of the push/pull pulses, the extraction voltages can be established in <100 ns, leading to a narrower injected kinetic energy distribution and an increase in the experimentally observed accepted m/z range of the ELIT. The symmetrical design of the injection components will generate an ion packet that has a 3D Gaussian profile which is beneficial for MR-TOF experiments. It is also possible to radially eject the ion packet between the rods using a different set of auxiliary electrodes.

The length of the segmented quadrupoles may be configured to prevent detrimental effects of the fringing fields, to minimize the TOF distance between the central quadrupole and ELIT (for a higher accepted m/z range), to allow realistic extraction voltages, and to generate packets which are Gaussian with an axial width which is less than that of the detection electrode.

The magnitude of the DC trapping field and push/pull voltages can be used to tune the space charge conditions, thereby providing a method to minimize peak coalescence at very high mass resolutions resulting in higher mass/abundance accuracy. The DC and RF fields may be dynamically changed in response to the number of trapped charges, i.e., the brightness of the beam. By ensuring that the packet width is less than the length of the pickup tube, the signal is maximized. In the absence of coalescence, this generates higher S/N spectra for a set transient length.

If coalescence is a problem, the number of injected ions could be reduced to minimize peak coalescence. Separate RF power supplies are not needed for the injection quadrupoles, reducing the instrument complexity/size/cost. The symmetrical and linear extraction field generate a Gaussian packet with a narrow temporal distribution, which may aid high resolution ion isolation, and MR-TOF functionality for "zoom scans".

Figure 4A:
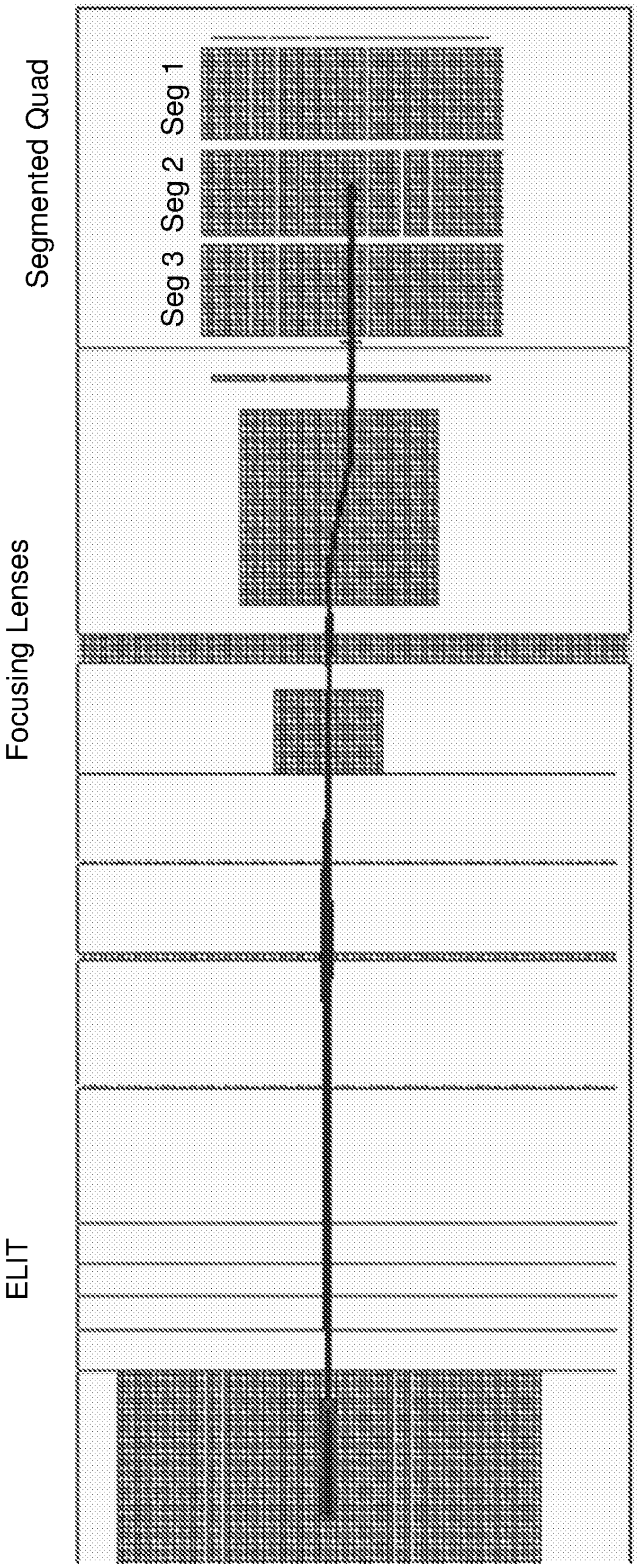
FIG. 4A illustrates simulation results for packets confined in a segmented quadrupole and ejected to an electrostatic linear ion trap, in accordance with an example embodiment of the disclosure.

FIG. 4A illustrates simulation results for packets confined in a segmented quadrupole and ejected to an electrostatic linear ion trap, in accordance with an example embodiment of the disclosure. Referring to FIG. 4A, there is shown SIMION v8.1 simulation results for a triple quadrupole with auxiliary electrodes, and including downstream ion optics and an ELIT. In this example, each quadrupole segment is 8 mm long with a rod radius of 4.69 mm, and an r0 of 4.17 mm, which is the distance from the pole to the center axis, with a 0.75 mm gap between each segment. The entrance and exits lenses are 0.75 mm away from segment 1 and 3, respectively. The auxiliary electrodes are configured to be a constant distance of 5 mm away from the center axis of the quadrupole and have the same axial length as their respective quadrupole segment. A person of ordinary skill in the art would appreciate that the geometry and size of the auxiliary electrodes is not limited to the example design represented here, but could instead be altered to reduce voltage requirements or change the shape of the injected ion packet, for example.

In this example, positive ions are axially confined in the center segment, Seg 2, by a +10V DC bias on segments 1 and 3, specifically on their corresponding auxiliary electrodes and exit/entrance lenses. The RF signal on all quadrupole segments is 1000 Vpp @ 1.8 MHz, placing tetraoctylammonium (m/z 466) at a q of ~0.19. Ions may be ejected by pulsing auxiliary electrodes 305A-305D and the entrance lens 301 to +250V while, simultaneously, auxiliary electrodes 309A-309D and the exit lens pulsed to −250V with a 100 ns rise time. The RF is left on continuously throughout this simulation, and the central quadrupole Seg 2 is biased to ground in this example. With a 250V push/pull 100 ns rise time pulsed DC voltage, the injected ion packet is 11 mm wide with a kinetic energy distribution of 3.1 eV @ FWHM, even with the RF left on.

Figure 4B:
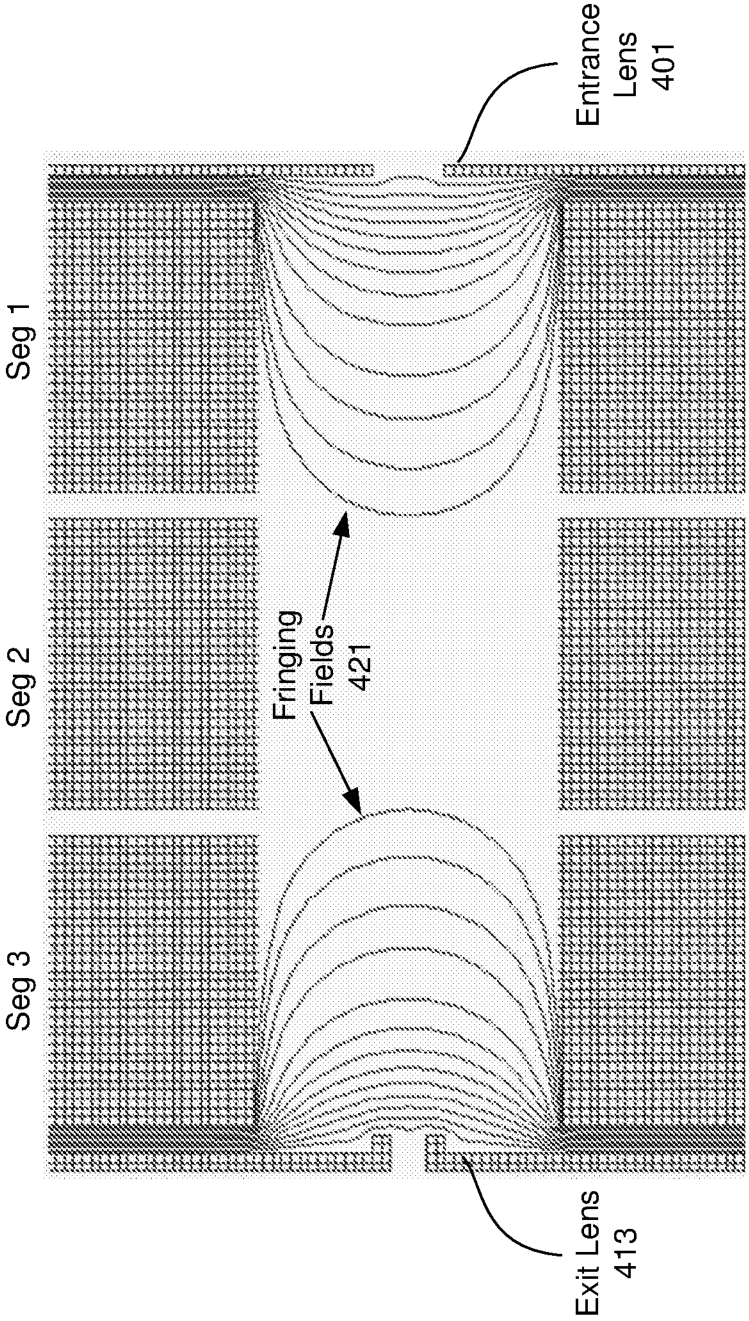
FIG. 4B illustrates simulation results of fringing fields in a segmented quadrupole, in accordance with an example embodiment of the disclosure.

FIG. 4B illustrates simulation results of fringing fields in a segmented quadrupole, in accordance with an example embodiment of the disclosure. Referring to FIG. 4*b*, there is shown fringing fields 421 in a triple quadrupole with entrance lens 401 and exit lens 413. As can be seen by the electric field lines, the fringing fields 421 from bias voltages on the entrance and exit lenses 401/413 and auxiliary electrodes (not shown) are confined to the outer segments, Seg 1 and Seg 3, and not present in the center segment Seg 2 where ions are confined, thereby enabling Gaussian ion packets and linear extraction fields.

Figure 5:
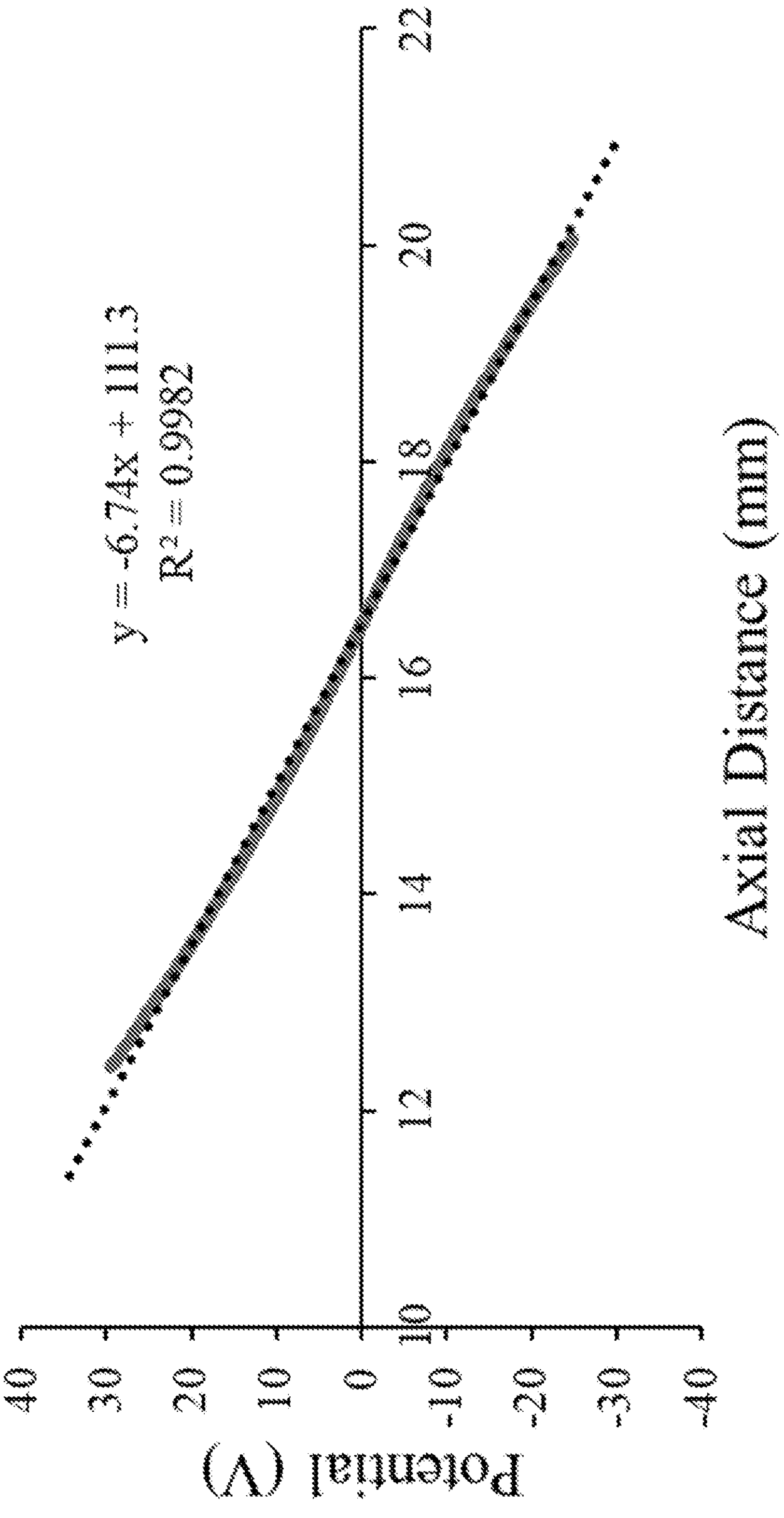
FIG. 5 illustrates a plot of the potential along the central axis of a center quadrupole segment, in accordance with an example embodiment of the disclosure.

FIG. 5 illustrates a plot of the potential along the central axis of a center quadrupole segment, in accordance with an example embodiment of the disclosure. Referring to FIG. 5, there is shown simulation results (solid line) for the potential along the central axis of the center quadrupole when ions are extracted using a +/−250V pulse. The linear regression is depicted by the dashed line, showing a 0.9982 correlation coefficient.

A linear potential in the center quadrupole of a segmented triple quadrupole, such as quadrupole 300 in FIG. 3, enables a narrower injected kinetic energy distribution into the ELIT and the retention of a Gaussian ion packet shape upon ejection.

Figure 6:
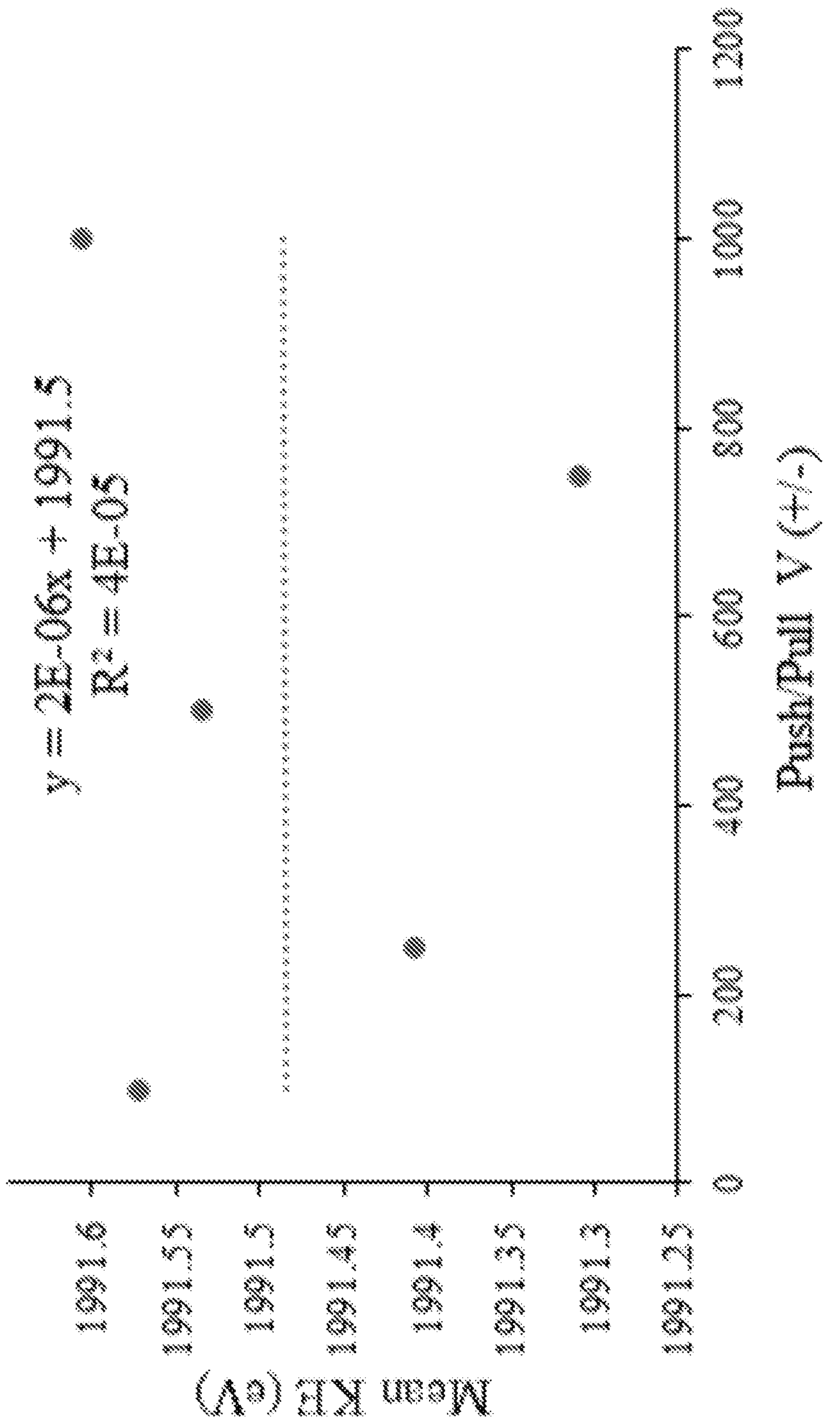
FIG. 6 illustrates the mean kinetic energy of ions versus push/pull voltage in a segmented quadrupole, in accordance with an example embodiment of the disclosure.

FIG. 6 illustrates the mean kinetic energy of ions versus push/pull voltage in a segmented quadrupole, in accordance with an example embodiment of the disclosure. Referring to FIG. 6, there is shown the mean kinetic energy of ions in a segmented triple quadrupole, such as quadrupole 300 in FIG. 3, where configuring the size of the segments to 8 mm prevents the fringing fields from interacting with the ions, as shown above in FIG. 4B. As the mean kinetic energy versus push/pull voltage is essentially flat with DC voltage, the mean injected KE is therefore completely decoupled from the push/pull voltage, with little or no measureable effect, indicating that the fringing fields are confined to the outer segments of the quadrupole and the rise time of the DC pulses allows for little or no ion packet movement before the extraction voltages are established.

Figure 7:
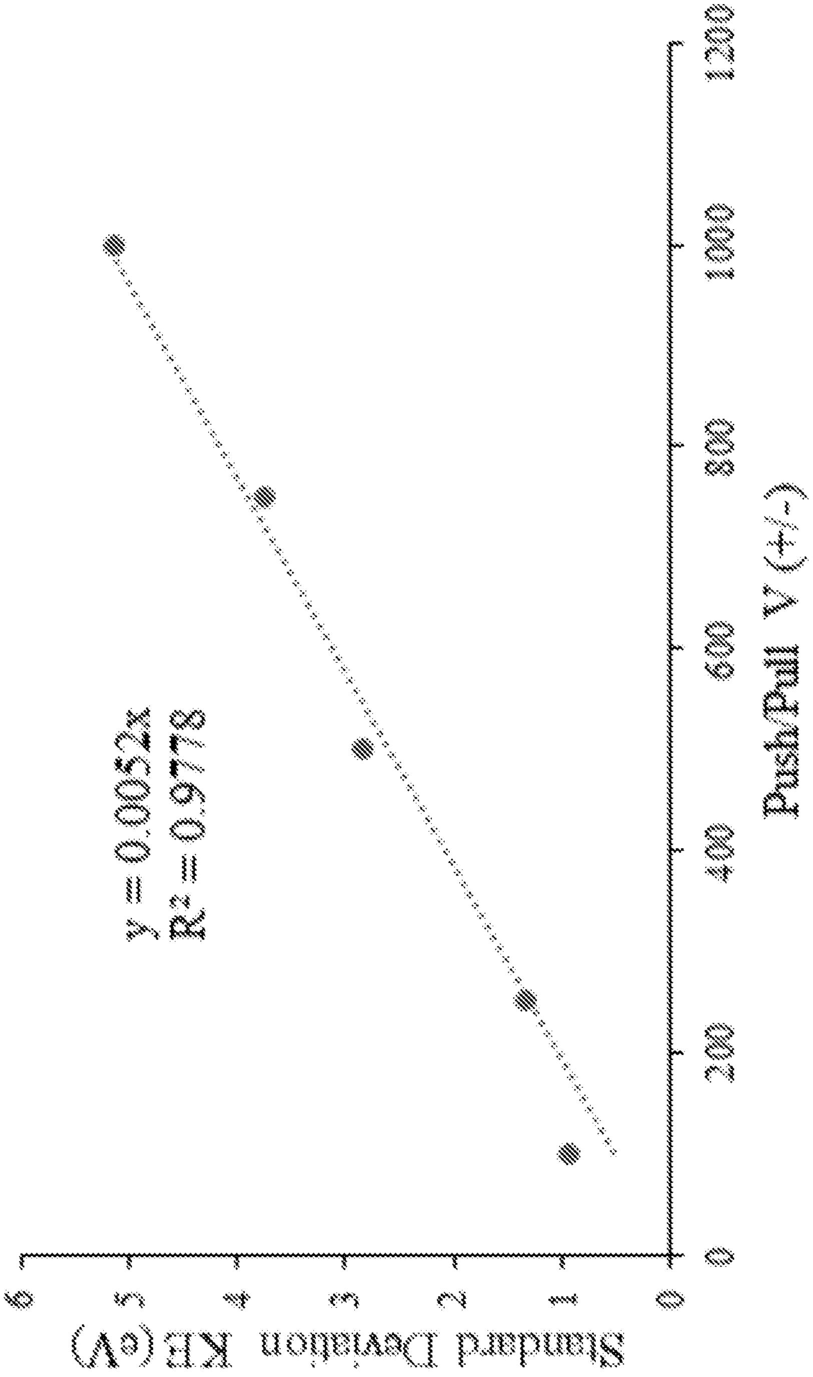
FIG. 7 illustrates the standard deviation of the kinetic energy distribution width versus push/pull voltage, in accordance with an example embodiment of the disclosure.

FIG. 7 illustrates the standard deviation of the kinetic energy distribution width versus push/pull voltage, in accordance with an example embodiment of the disclosure. Referring to FIG. 7, it can be seen that the distribution width increases linearly with push/pull voltage applied to entrance exit lenses and auxiliary electrodes above 250 V. Therefore, a desired distribution width may be configured by the push/pull voltage for a kinetic energy standard deviation of less than 2 eV for voltages under about 400 V.

Figure 8:
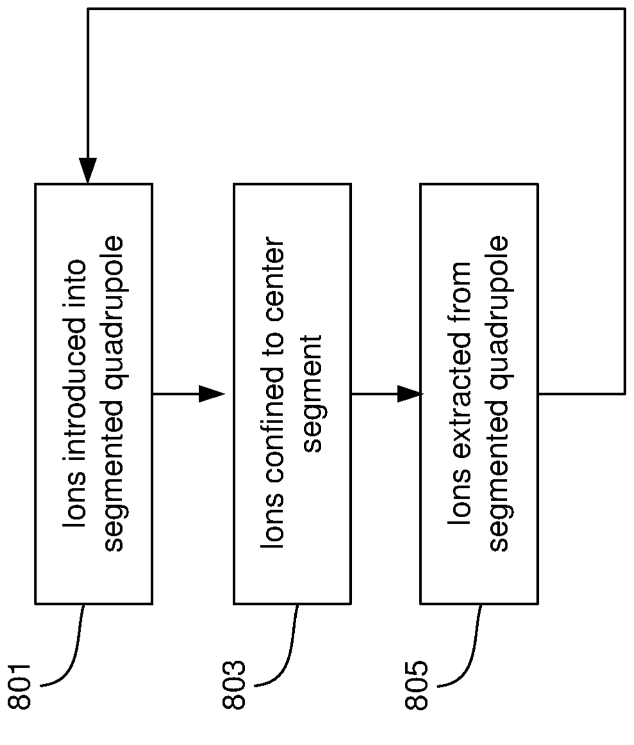
FIG. 8 is a flow diagram for a segmented quadrupole, in accordance with an example embodiment of the disclosure.

FIG. 8 is a flow diagram for a segmented quadrupole, in accordance with an example embodiment of the disclosure. Referring to FIG. 8, the process begins in step 801 where ions may be introduced to the segmented quadrupole via the entrance lens, which may be biased with a potential for attracting the charged ions and the exit lens biased with a repulsive field to confine the ions within. In step 803, the auxiliary electrodes and entrance/exit lenses may be biased with repulsive DC potentials and the poles of the all three segments may be coupled to an RF voltage such that the ions are confined to the center segment, resulting in an ion packet with a narrow Gaussian profile. In one example, positive ions are axially confined in the center segment, Seg 2, by a +10V DC bias on segments 1 and 3, specifically on their corresponding auxiliary electrodes and exit/entrance lenses and the RF signal on all quadrupole segments is 1000 Vpp @ 1.8 MHz In step 805, the confined ions may be extracted from the quadrupole via the exit lens by applying push/pull DC voltages on the entrance/exit lenses and auxiliary electrodes in the first and third segments or an attractive potential on the exit lens and/or the auxiliary electrodes of segment 3. The RF voltage can remain on during the extraction process, meaning separate DC voltages may be coupled at high speed without having to collapse the RF field. In one example, ions may be ejected by pulsing auxiliary electrode 1 (AUX1) and the entrance lens to +250V while, simultaneously, AUX3 and the exit lens pulsed to −250V (100 ns rise time). In another example, the RF fields may be collapsed/deactivated during ion ejection. The process may proceed to step 801 again where further ions may be introduced to the quadrupole in a repeating process.

A system and/or method implemented in accordance with various aspects of the present disclosure, for example, provides a quadrupole comprising first, second, and third quadrupole segments. The second quadrupole segment may be arranged between the first and third quadrupole segments and the first quadrupole segment and the third quadrupole segment may each comprise four poles with auxiliary electrodes arranged between each pair of the four poles. The second quadrupole segment may comprise four poles and the first and third quadrupoles each may comprise four individually addressable auxiliary electrodes or optionally two pairs of auxiliary electrodes with each pair operable to receive a bias voltage. In another example scenario, the first and third quadrupoles each comprise two auxiliary electrodes, or one pair of auxiliary electrodes.

The auxiliary electrodes of the first quadrupole segment and the entrance lens may be biased at a same direct current (DC) voltage. The auxiliary electrodes of the third quadrupole segment and the exit lens may be biased at a same DC voltage. Charged ions may be confined to the second quadrupole section by applying radio frequency (RF) and DC voltages to the poles of the first, second, and third quadrupole sections and a first DC voltage to the auxiliary electrodes and the entrance and exit lenses. Charged ions may be ejected from the quadrupole by pulsing the entrance and exit lenses and auxiliary electrodes using a second DC voltage at the auxiliary electrodes and the entrance and exit lenses.

The second DC voltage may comprise a push-pull potential at the entrance and exit lenses or optionally an attractive potential at the exit lens. The ejected ions may comprise Gaussian ion packets upon application of the second DC voltage to the exit lens and auxiliary electrodes. Fringing fields generated by voltages coupled to the entrance and exit lenses may be confined to the first and third quadrupole sections. Each pair of poles in the first quadrupole section may be capacitively coupled to corresponding pairs of poles in the second and third quadrupole sections. The auxiliary electrodes may be equidistant from a center axis of the quadrupole along a length of the quadrupole or optionally have increasing distance from the center axis away from a center of the quadrupole.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A mass spectrometer system comprising:
- a quadrupole comprising first, second, and third quadrupole segments, wherein:
  - the second quadrupole segment is arranged between the first and third quadrupole segments;
  - the first quadrupole segment and the third quadrupole segment each comprise four poles with auxiliary electrodes arranged between each pair of the four poles; and
  - the second quadrupole segment comprises four poles and is free of auxiliary electrodes.

2. The mass spectrometer system according to claim 1, wherein the first and third quadrupole segments each comprise four individual auxiliary electrodes, two pairs of auxiliary electrodes, two electrodes, or optionally one pair of auxiliary electrodes.

3. The mass spectrometer system according to claim 1, wherein the auxiliary electrodes of the first quadrupole segment and an entrance lens are biased at a same direct current (DC) voltage.

4. The mass spectrometer system according to claim 3, wherein the auxiliary electrodes of the third quadrupole segment and an exit lens are biased at a same DC voltage.

5. The mass spectrometer system according to claim 4, wherein charged ions are confined to the second quadrupole segment by applying radio frequency (RF) and DC voltages to the poles of the first, second, and third quadrupole segments and a first DC voltage to the auxiliary electrodes and the entrance and exit lenses.

6. The mass spectrometer system according to claim 4, wherein charged ions are ejected from the quadrupole by pulsing the entrance and exit lenses and auxiliary electrodes using a different DC voltage at the auxiliary electrodes and the entrance and exit lenses.

7. The mass spectrometer system according to claim 6, wherein the different DC voltage comprises a push-pull potential at the entrance and exit lenses.

8. The mass spectrometer system according to claim 6, wherein the ejected ions comprise Gaussian ion packets upon application of the different DC voltage to the exit lens and auxiliary electrodes.

9. The mass spectrometer system according to claim 1, wherein fringing fields generated by voltages coupled to entrance and exit lenses are confined to the first and third quadrupole segments.

10. The mass spectrometer system according to claim 1, wherein each pair of poles in the first quadrupole segment is capacitively coupled to corresponding pairs of poles in the second and third quadrupole segments.

11. The mass spectrometer system according to claim 1, wherein the auxiliary electrodes are equidistant from a center axis of the quadrupole along a length of the quadrupole or optionally have increasing distance from the center axis away from a center of the quadrupole.

12. A method for mass spectrometry, the method comprising:
- in a quadrupole comprising first, second, and third quadrupole segments, wherein the second quadrupole segment is arranged between the first and third quadrupole segments, the first quadrupole segment and the third quadrupole segment each comprise four poles with auxiliary electrodes arranged between each pair of the four poles, and the second quadrupole segment comprises four poles and is free of auxiliary electrodes:
  - confining ions in the second quadrupole segment utilizing voltages applied to the quadrupole.

13. The method according to claim 12, wherein the first and second quadrupole segments each comprise four individual auxiliary electrodes, two pairs of auxiliary electrodes, two electrodes, or optionally one pair of auxiliary electrodes.

14. The method according to claim 12, comprising biasing the auxiliary electrodes of the first quadrupole segment and an entrance lens at a same DC voltage.

15. The method according to claim 14, comprising biasing the auxiliary electrodes of the third quadrupole segment and an exit lens at a same DC voltage.

16. The method according to claim 15, comprising confining charged ions in the second quadrupole segment by applying RF and DC voltages to the poles of the first, second, and third quadrupole segments and a first DC voltage to the auxiliary electrodes and the entrance and exit lenses.

17. The method according to claim 15, comprising ejecting charged ions from the quadrupole by pulsing the entrance and exit lenses and auxiliary electrodes using a different DC voltage at the entrance and exit lenses and auxiliary electrodes.

18. The method according to claim 17, wherein the different DC voltage comprises a push-pull potential at the entrance and exit lenses.

19. The method according to claim 17, wherein the ejected ions comprise Gaussian ion packets upon application of the different DC voltage to the entrance and exit lenses and auxiliary electrodes.

20. The method according to claim 12, wherein fringing fields generated by voltages coupled to entrance and exit lenses are confined to the first and third quadrupole segments.

21. The method according to claim 12, comprising capacitively coupling each pair of poles in the first quadrupole segment to corresponding pairs of poles in the second and third quadrupole segments.

22. The method according to claim 12, wherein the auxiliary electrodes are equidistant from a center axis of the quadrupole along a length of the quadrupole or optionally have increasing distance from the center axis away from a center of the quadrupole.

* * * * *